July 14, 1959     I. S. JACOBSEN     2,895,048
VIBRATORY REED IN ELECTRONIC HEADING SENSING DEVICE
Filed Feb. 19, 1954     2 Sheets-Sheet 1
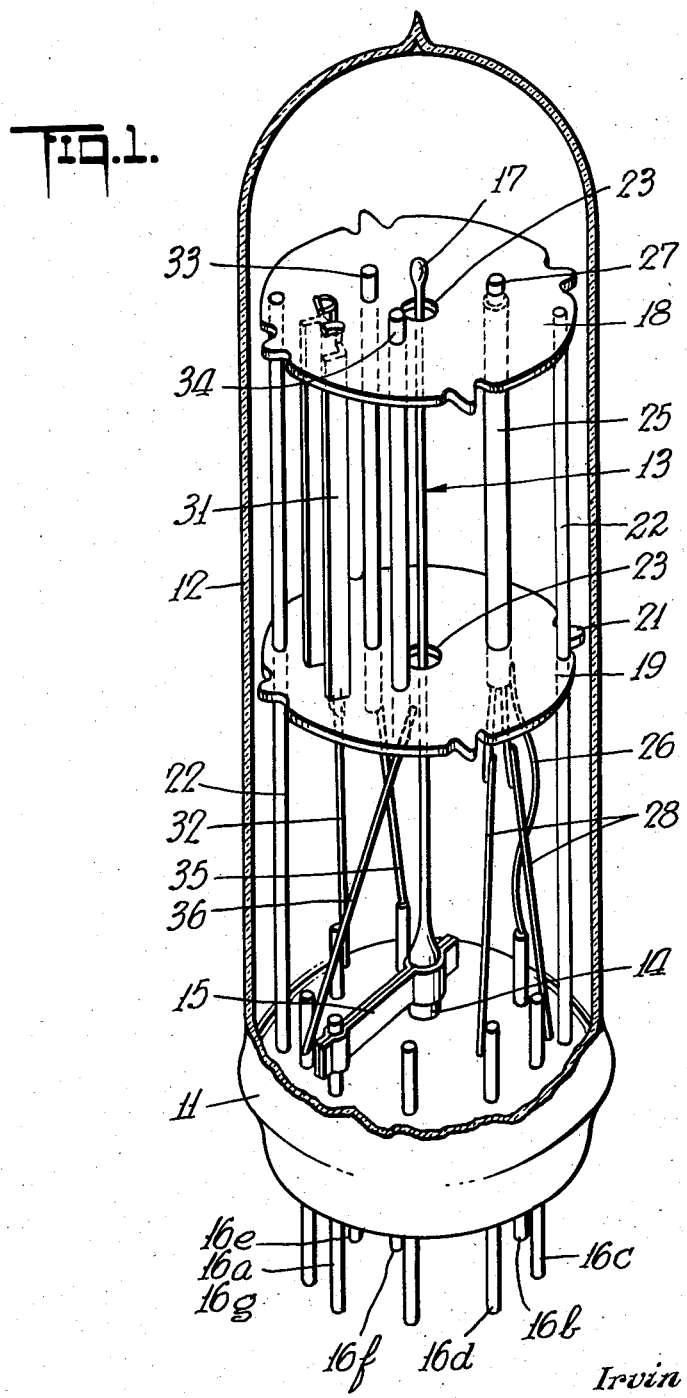
INVENTOR.
Irvin S. Jacobsen
BY
Dean Fairbank + Hirsch
ATTORNEYS July 14, 1959  I. S. JACOBSEN  2,895,048
VIBRATORY REED IN ELECTRONIC HEADING SENSING DEVICE
Filed Feb. 19, 1954  2 Sheets-Sheet 2
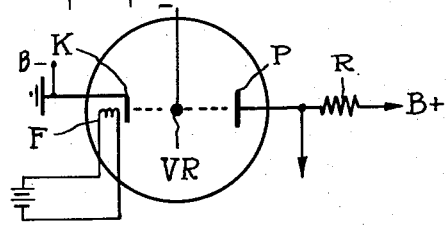
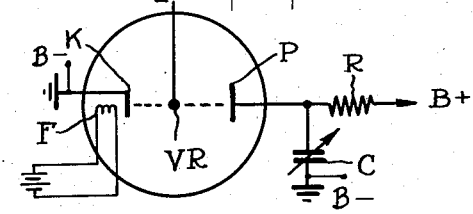
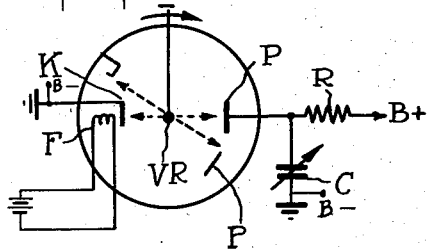
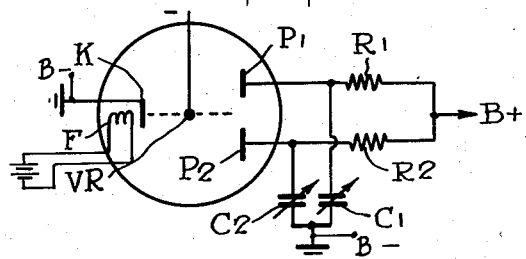
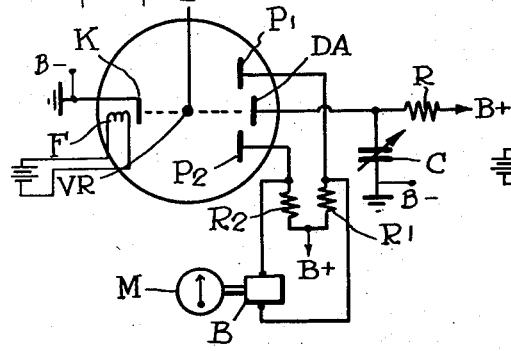
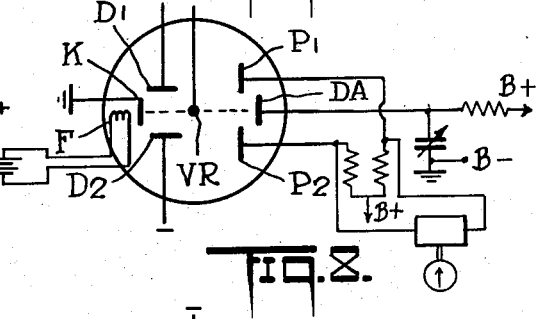
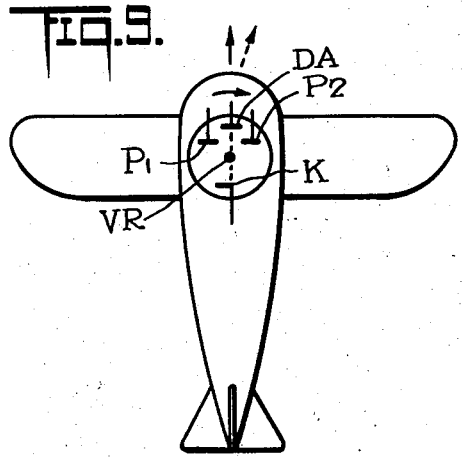
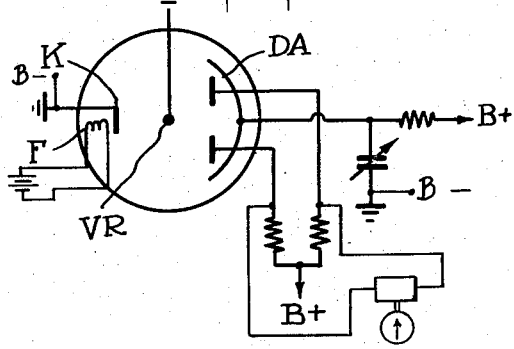
INVENTOR
*Irvin S. Jacobsen*
BY
*Dean Fairbank & Hirsch*
ATTORNEYS

United States Patent Office 2,895,048
Patented July 14, 1959

2,895,048

VIBRATORY REED IN ELECTRONIC HEADING SENSING DEVICE

Irvin S. Jacobsen, Drexel Hill, Pa., assignor to Clifton Precision Products Co., Inc., a corporation of Pennsylvania Application February 19, 1954, Serial No. 411,471

7 Claims. (Cl. 250—27)

This invention relates to the art of sensing devices, more particularly of the type to provide an indication of the deviation of a craft from a predetermined direction.

It is noted that where gyroscopic devices having rotating elements are utilized to provide indications of deviation from a given direction of a moving vessel or aircraft, for example, the rotating elements must be made with great precision and as they are of extreme delicacy must be handled carefully and are likely to become deranged with shock, vibration, impact or with variations in temperature that are not compensated by complex equipment. Furthermore, the need for a motor to drive the rotating element of the gyroscope adds bulk and weight to the unit which in many applications, such as the control for the automatic pilot of an aircraft, is undesirable.

Where an indicating device is utilized which is of low sensitivity and requires complex electronic equipment such as amplifiers or oscillators to convert a weak signal to a useful value, the resultant equipment is bulky, expensive and heavy and by reason of its complexity is subject to breakdown and hence requires considerable maintenance.

It is accordingly among the objects of the invention to provide a sensing device which is neat, compact, light in weight and of extreme sensitivity and which may readily be manufactured at relatively low cost, which has but a single moving part, which is not likely to become deranged and which is relatively unaffected by vibration, shock, impact or temperature variation and which will dependably and substantially instantaneously, without the need for complex oscillators or amplifiers, provide an electrical signal of substantial amplitude and of value proportional to the amount of deviation of the device from a predetermined direction, to operate a suitable indicator.

According to the invention from its broadest aspect, a member vibrating along a preferred plane, modulates an electron beam to provide an electrical signal of a given amplitude and frequency. When the support for such member is rotated about a plane at right angles to the plane of vibration of the member, the signal will vary by an amount proportional to the degree of such vibration of the member, the signal will vary by an amount proportional to the degree of such rotation.

More specifically the vibrating member is an electrically conductive reed mounted so as to vibrate between an electron emitting cathode and an electron collecting anode to provide a signal at the anode of amplitude depending upon the position of the plane of vibration of the reed with respect to such anode.

According to one specific embodiment of the invention, the reed is mounted in an evacuated envelope, between the cathode and a drive anode, and the collecting anode is preferably split and symmetrically positioned on each side of the normal plane of vibration of the reed, between the reed and the drive anode, so that a signal may be developed at each of such collecting anodes for operation of a suitable indicating device.

In the accompanying drawings in which are shown one or more of various possible embodiments of the several features of the invention, Fig. 1 is a perspective view of the sensing device according to one embodiment of the invention, Figs. 2 to 5 inclusive are diagrammatic views illustrating the operation of the device, Fig. 6 is a diagrammatic view illustrating an application of the device shown in Fig. 1, Figs. 7 and 8 are diagrammatic views illustrating modifications of the device shown in Fig. 1, and Fig. 9 is a diagrammatic view illustrating the method of installing the sensing device in an aircraft.

Referring now to the drawings, the sensing device shown in Fig. 1 desirably comprises a base 11 of any suitable insulating material such as glass, to which is affixed with an airtight seal, the end of an elongated substantially cylindrical envelope 12 which also is desirably of glass, the container thus formed being evacuated in the manner of a conventional vacuum tube.

Extending outwardly from the base 11 at substantially right angles thereto is a vibratory member 13, desirably a thin flexible rod or reed, preferably of fused quartz which has a low coefficient of internal viscosity and hence will vibrate readily and for a long period once set into motion. It is of course to be understood that if desired, the vibratory member 13 could be supported at its upper end or could be a string or wire-like element supported at both ends.

As illustratively shown, the reed 13 is generally circular in cross section. However, if desired, it may be conformed to be elliptical or rectangular in cross section to have a preferred plane of vibration.

The reed 13 desirably has a massive base 14, preferably formed integral therewith and of the same material. Although the reed 13 may be supported in any suitable manner, it is illustratively shown clamped at its base 14 between two mounting straps 15 of electrically conductive material which are securely affixed to one of a plurality of pins or terminals 16, illustratively the terminal 16a, embedded in the base 11 and protruding from opposed surfaces thereof.

If desired, the free end of the reed 13 may have an enlarged portion 17 also formed from the fused quartz so that the reed may have the desired natural frequency of vibration.

The reed 13 has an electrically conductive portion at its upper end which is electrically connected to the associated terminal 16a. For this purpose, the reed 13 and its base 14 are desirably covered with a thin coating of electrically conductive material such as gold so that the straps 15 will provide an electrical connection between the reed and the terminal 16a.

Positioned in the envelope 12 is a pair of insulating discs 18 and 19, preferably of mica, each of which has radially projecting fingers 21 to center the discs in the envelope. The discs may be supported in spaced relationship in any suitable manner such as on upright posts 22 embedded at one end in the base 11.

The discs 18 and 19 have axially aligned openings 23 through which the reed 13 extends, the diameter of said openings being sufficient to permit maximum vibration of the upper portion of the reed 13.

Mounted between the discs 18 and 19 on one side of the reed is a sleeve 25 which forms a cathode and is desirably coated with suitable electron emissive material. The sleeve 25 is electrically connected as by lead 26 to a terminal 16b, for example, and contains a filament 27 connected by leads 28 to the terminals 16c and 16d.

Diametrically opposed to the cathode sleeve 25, on the other side of the reed, is a metallic drive anode 31, preferably in the form of a channel-shaped member for mechanical rigidity. The anode 31 is supported at its ends between the discs 18 and 19 and is electrically connected by lead 32 to terminal 16e.

The sensing device has means to collect the electrons emitted by the cathode 25. Such means desirably comprises a split signal anode illustratively a pair of metallic collector rods 33 and 34 connected respectively by leads 35 and 36 to terminals 16f and 16g. The rods 33 and 34 are supported by the discs 18 and 19 and positioned between the drive anode 31 and the reed 13 and are symmetrically arranged on each side of the normal plane of vibration of the reed 13 between the cathode 25 and the drive anode 31.

The general principles of the operation of the sensing device will now be described.

It is known in the art of vacuum tubes that if the grid should be polarized negatively with respect to the cathode, with a potential such as to permit conduction of the tube and with a positive potential applied to the plate, a given signal will be developed at such plate. It is also known that a small voltage change on the grid will cause a large voltage change in the plate circuit, resulting in an amplification of the signal applied to the grid.

As a result of the foregoing, if the grid should be moved from its neutral position toward and away from the plate, slight movement of the grid toward the plate will cause the electron repelling effect of the negatively polarized grid on the beam of electrons from the cathode to be greatly reduced with consequent great increase in the plate signal and inversely, a slight movement of the grid away from the plate will cause its electron repelling effect on such beam of electrons to be greatly increased with consequent great decrease in the plate signal.

Thus, the amplitude of the plate signal will vary greatly with such movements of the grid due to the inherent amplification qualities of a vacuum tube.

Figs. 2 to 5 serve to illustrate the principles of the invention and Fig. 6 is a diagrammatic showing of the device of Fig. 1 in a circuit.

Referring to Fig. 2, when the cathode K is heated by the filament F, the electrons emitted from said said cathode will be attracted by the anode or plate P connected to a source of postive potential and the resultant current flow through resistor R will cause a voltage to be developed across such resistor.

The reed VR, which corresponds to the grid previously described, is connected so that it is negatively polarized with respect to the cathode and hence there will be an electrostatic attraction between the negative reed VR and the positive plate P. Consequently, the reed VR will be deflected toward the plate P.

As the negative reed VR moves toward the plate P, it will have less effect in repelling the negative electrons emitted by the cathode and hence the plate current will increase so that there will be a corresponding increase in the voltage drop across resistor R and the positive potential on plate P will decrease. Consequently, there will be a decrease in the force attracting the reed toward the plate and its inherent restoring force will cause it to deflect away from the plate past its neutral position shown in Fig. 2.

As the negative reed VR approaches the cathode K, it will have more and more control over the electron flow, so that the plate current will fall and the plate potential will rise. Consequently, the reed will again be attracted toward the plate as previously described.

Such vibratory movement or oscillation of the reed of Fig. 2 will continue until, due to the internal viscosity of the reed, its amplitude of vibration will radically decrease until it attains a position of equilibrium somewhere between its neutral position shown in Fig. 2 and the plate P, the frequency of oscillation of the reed being dependent upon its natural characteristics such as its length, weight, etc.

The extent of the modulation of the electron beam is directly proportional to the amplitude of the oscillatory movements of the reed and hence the greater the amplitude of vibration the greater will be the variations in the pulsating or alternating output voltage developed across resistor R.

In order to maintain the reed oscillating, a feed back circuit is provided which, as shown in Fig. 3, comprises a capacitor C, preferably of the variable type, connected between the plate P and ground which is the return for the positive or B+ source.

With the capacitor C in circuit, the alternating voltage developed at the plate by the vibrating reed will cause the capacitor to be charged. As such capacitor will retain its charge for a period based upon the time constant of the capacitor C and resistor R, a positive potential will be maintained on the plate to attract the reed VR more than it would normally be attracted if such potential was not present. Consequently, as the voltage at the plate will be the same, each time the reed approaches the latter, the reed will continue its vibration at its natural frequency without loss of amplitude and such vibrations will be sustained as long as the operating potentials are applied.

In view of the foregoing, it is apparent that with the reed oscillating, a voltage will be developed across the plate resistor R. If the device should be rotated about a plane at right angles to the normal plane of vibration of the reed, due to the tendency of the reed to maintain such normal plane of vibration, the plate P would be displaced with respect to the plane of vibration of the reed as shown in dot and dash lines in Fig. 4. Hence as the reed is moved away from the plate P, the negatively polarized reed would have less effect in repelling the electrons and the plate current would increase materially with resultant drop in the voltage across resistor R and such voltage change would be a measure of the degree of rotation of the device.

For more accurate indication of the degree of rotation of the device, as shown in Fig. 5, it is preferred to have two collector or signal plates P1 and P2 symmetrically positioned on each side of the normal plane of vibration of the reed. Thus as the device rotates, the reed will vibrate in a plane that approaches one of the plates more than the other and hence the signal voltage developed across the resistors R1, R2 will increase and decrease depending upon the direction of rotation of the device.

Although the desired feed back circuit may be provided by connecting a capacitor C1 and C2 in each of the plate circuits as shown, due to the fact that it is extremely difficult if not impossible, to have two identical capacitors and to have the plate resistances identical, there may be a phase shift between the respective signal voltages with resultant inaccurate indication of the degree of rotation of the device.

To overcome this difficulty, for more accurate indication, the circuit diagrammatically shown in Fig. 6 is provided which utilizes the device shown in Fig. 1.

Thus, the drive anode DA (element 31 of Fig. 1) is provided between the two collector signal plates P1 and P2 (elements 33, 34 of Fig. 1) and in the use of the device, the drive anode DA is connected through a resistor R to B+ and through a capacitor C to ground to provide the feed back circuit previously described. The signal voltages are developed across two resistors R1 and R2 connected respectively in series between each of the plates P1, P2 and B+.

Although the sensing device may operate any suitable indicator, in Fig. 6 a typical installation is illustratively shown.

Thus the signal resistors R1 and R2 are so connected through conventional circuits, represented by the block B, that the voltages developed across such resistors will oppose each other. The resultant differential signal appearing at the output of said voltage opposing unit B may be fed to a direct reading current responsive meter M of the center scale type to indicate the direction and extent of the rotation of the device.

To increase the sensitivity of the sensing device of Fig. 1, as diagrammatically shown in Fig. 7, a pair of deflecting plates D1 and D2 may be symmetrically positioned on each side of the normal plane of vibration of the reed, VR (element 13 of Fig. 1), between the reed and cathode K (element 25 of Fig. 1) for example. These plates, in use of the device, would be negatively polarized so that the electron beam emitted from the cathode K, would be greatly concentrated. Thus the negatively polarized reed would have a greater modulating effect on such concentrated electron beam with resultant increase in the signal variation and hence increase in the sensitivity of the device.

As previously described, the sensitivity of the sensing device is a factor of the amplitude of vibration of the reed. As the device is rotated in operation, the plane of vibration of the reed will be displaced with respect to the drive anode and hence as the distance increases, the attraction between the negatively polarized reed and positively polarized drive anode will be correspondingly reduced. Consequently, the amplitude of vibrations will also be reduced with reduction of sensitivity.

Where a device of extreme sensitivity is desired, the embodiment shown in Fig. 8 may be utilized which is substantially identical to the embodiment of Fig. 1 except that the drive anode DA (element 31 of Fig. 1) is an arcuate member having the axis of the reed VR (element 13 of Fig. 1) as its origin.

Thus, regardless of the plane of vibration of the reed, at each identical position of the latter in any of such planes, the distance from the reed to the arcuate drive anode will be identical as will be the attraction therebetween so that the amplitude of vibration of the reed will be unaffected by variations in its plane of vibration.

Although the sensing device has many applications, one typical use is to give an indication of the deviation of an aircraft from a given heading.

For such use the sensing device would desirably be mounted in the aircraft with the reed extending at right angles to the longitudinal axis of the aircraft and with the normal plane of vibration of the reed extending parallel to the vertical axis of the aircraft as illustratively shown in Fig. 9.

Referring to the circuit shown in Fig. 6, which incorporates the sensing device of Fig. 1, when the sensing device is energized, the reed will vibrate as previously described. As the reed is vibrating in its normal plane determined by the center line of the cathode K and drive anode DA, by reason of its negative polarity, it will split the electron beam in substantially equal parts so that the unit B will be in balance and the meter M will be at neutral position.

If the heading of the aircraft shown in Fig. 9 should be changed, the sensing device would be rotated in a corresponding direction. However, the tendency of the vibrating reed to maintain its original plane of vibration would cause its new plane of vibration to be displaced from its original plane by an amount less than the amount of rotation of the sensing device as illustratively shown in Fig. 4.

Consequently, the plane of vibration of the reed would move toward one of the collector signal anodes, say anode P1 and away from anode P2. The effect would be to change the distribution of electrons received by the anodes P1, P2 and more electrons would flow to anode P2. As a result, the current flow through resistor R2 would increase with resultant increase in the voltage drop across such resistor and the current flow through resistor R1 would decrease with resultant decrease in the voltage drop across such resistor.

As the resistors R1 and R2 are connected in opposition through the unit B, current would flow from such unit, of polarity and amplitude determined by the direction and magnitude of the deviation of the heading of the aircraft from its original heading and a direct indication of the direction and extent of the change of heading would be provided by the meter M.

In determining the physical characteristics of the reed, which control its natural frequency of vibration, it is noted that the more rapid the vibration of the reed, the more difficult it is to change its plane of vibration. Hence, in order that extraneous shocks, impact or vibrations do not cause the development of an oscillation of the reed along a plane other than its normal plane of vibration with resultant spurious indications, it is desirable that the natural frequency of the reed be as high as possible. However, the greater the natural frequency of vibration of the reed, the less its sensitivity, as it will offer correspondingly greater resistance to any change of its normal plane of vibration with normal changes in heading, for example.

Consequently, the selection of the physical characteristics of the reed requires a compromise between sensitivity and accuracy. Thus, in a typical sensing device, the reed may have a diameter of about 100 microns (.004 inch), and a length of about twelve millimeters, such parameters of course being merely illustrative.

Although the sensing device herein has been illustratively shown and described as applied to a system to give a direct reading on a current responsive meter to indicate changes in the heading of a craft, it is of course to be understood that it could be incorporated into systems to show the rate of turn and the amount of pitch or roll of such craft, or in systems in which the differential signal drives a servo-motor which continuously repositions the sensing device, restoring it to its neutral position, the amount and direction of such drive being a measure of the original angular deviation.

The sensing device above described is extremely sensitive to deviations in direction at right angles to the normal plane of movement of the vibrating member, and by reason of its light weight and compactness it is not likely to become deranged even with relatively violent shock or impact. Furthermore, by reason of the inherent amplifying qualities of the unit, it can actuate a current responsive meter to give the desired indications without the need for bulky and complex amplifiers, which are subject to breakdown and require considerable maintenance.

As many changes could be made in the above construction and system, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device of the character described comprising an evacuated envelope including a member adapted to emit electrons when energized, at least two members adapted to collect electrons when positively polarized, an additional member also adapted to collect electrons when positively polarized, a vibratable element between said emitting member and said collecting members, said vibratable element having a portion thereof adapted to be negatively polarized and in the path of the stream of electrons from said emitting member to said collecting members.

2. A sensing device comprising an evacuating envelope including an electron emitting member, a plurality of electron collecting members including a drive anode opposed to said electron emitting member and a pair of signal anodes substantially symmetrically positioned on each side of a line between said drive anode and said electron emitting member and a vibratory member positioned between said opposed electron emitting member and said drive anode, said vibratory member having a portion thereof adapted to be negatively polarized and in the path of the stream of electrons from said electron emitting member, said vibratory member having a normal plane of vibration along a line between said electron emitting member and said drive anode and designed to modulate the electron beam from said electron emitting member.

3. The combination set forth in claim 2 in which said signal anodes are positioned between said vibratory member and said drive anode.

4. The combination recited in claim 2 in which a pair of electron beam directing members are provided substantially symmetrically arranged on each side of the normal plane of vibration of said vibratory member to confine said beam of electrons.

5. The combination recited in claim 2 in which a pair of electron beam deflecting members are provided substantially symmetrically arranged on each side of the normal plane of vibration of the vibratory member and positioned between the electron emitting member and the vibratory member.

6. The combination recited in claim 2 in which the drive anode is an arcuate member having the axis of the vibratory member as its point of origin and extending beyond both of the signal anodes.

7. Sensing equipment of the character described comprising an electron emitting cathode, an electron collecting drive anode opposed to said electron emitting cathode, a resistor in series with said drive anode, a vibratory element positioned between said opposed cathode and said drive anode and having a normal plane of vibration along a line between said electron emitting cathode and said drive anode, a pair of electron collecting signal anodes arranged between said vibratory element and said drive anode and substantially symmetrically positioned on each side of the normal plane of vibration of the vibratory element, a resistor in series with each of said signal anodes, means to negatively polarize said vibratory element with respect to said cathode and said anodes, means to connect a source of positive potential through each of said resistors to said anodes, whereby upon vibration of said vibratory element the beam of electrons from said cathode to said anodes will be modulated to provide an alternating signal across each of the associated resistors, an evacuated envelope containing said cathode, said vibratory element and said anodes, a capacitor having one side connected to the drive anode and means to connect the other side of said capacitor to the return side of said source of positive potential, whereby, the electrostatic force on the vibratory element will be periodically changed in such phase that energy will be electrostatically supplied thereto.

References Cited in the file of this patent
UNITED STATES PATENTS

| | | |
|---|---|---|
| 1,860,285 | Gunn | May 24, 1932 |
| 2,244,260 | Power | June 3, 1941 |
| 2,290,531 | Brett | July 21, 1942 |